INVENTOR.
ANSELM DeGHETTO
BY
Oberlin & Limbach
ATTORNEYS

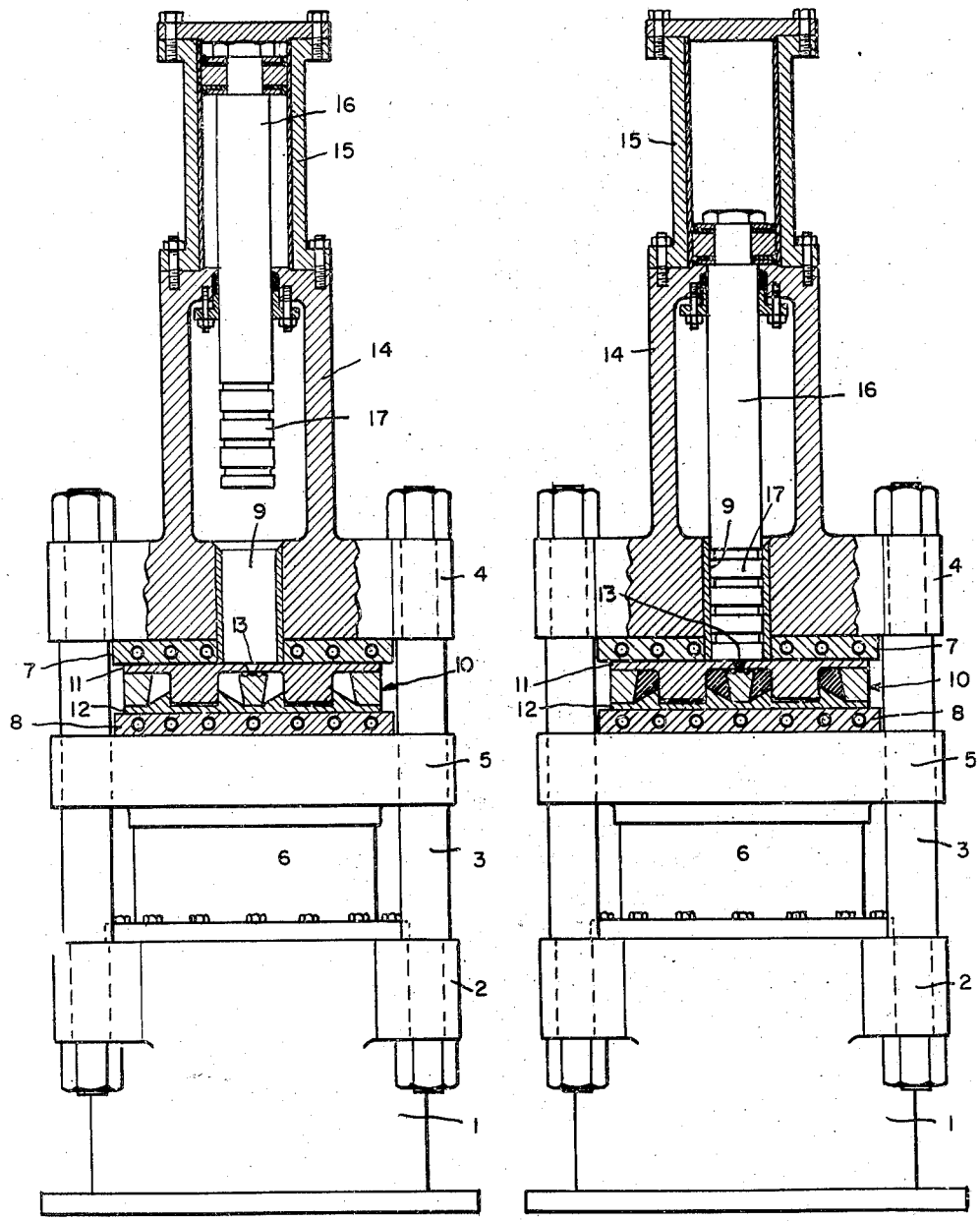

Patented July 5, 1949

2,475,378

UNITED STATES PATENT OFFICE 2,475,378

TRANSFER MOLDING PRESS

Anselm De Ghetto, Clifton, N. J., assignor to National Rubber Machinery Company, Akron, Ohio, a corporation of Ohio Application April 24, 1945, Serial No. 589,962

10 Claims. (Cl. 18—30)

This invention relates as indicated to molding presses and more particularly to the type of press which is referred to in the art as an injection molding press.

It is a principal object of my invention to provide a press of the character described which is particularly applicable for use in the transfer molding of rubber and rubber-like materials.

It is a further and more particular object of the invention to provide a press of the character described which is not only economical to manufacture but is also extremely simple in its operation and in which the residue of any molding charge may be readily removed from the press at the conclusion of each molding operation.

It is a further object of the invention to provide a press in which high unit pressures may be developed during the transfer molding operation without, however, resulting in objectionable deflection of the mold parts.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a front elevational view partially in section of a press showing one embodiment of the principles of my invention;

Fig. 2 is a view of the press illustrated in Fig. 1 but with the injection ram in a different position.

Figure 3:
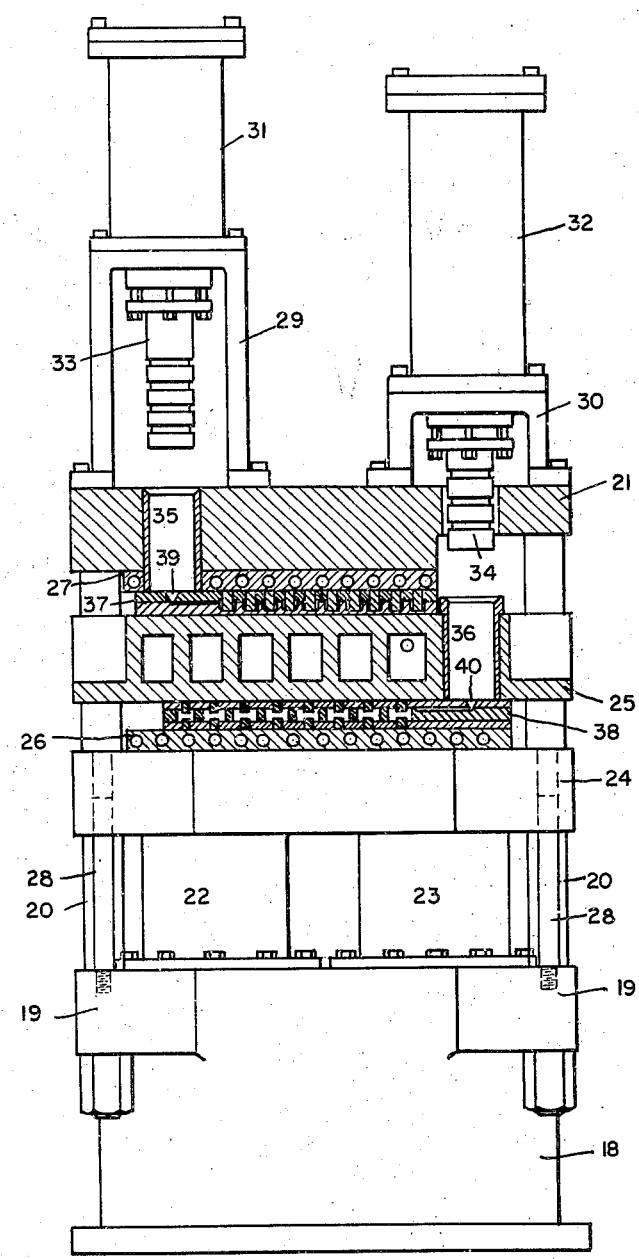
Fig. 3 is a front elevational view partially in section of a modified form of construction of the press of my invention.

Referring now more specifically to the drawings and more especially to Fig. 1, the press here illustrated comprises a base 1 which is preferably cylindrical in form and from which project four equally spaced lugs 2, said lugs being spaced preferably at 90°. Carried by the lugs 2 are an equal number of strain rods 3, to the upper ends of which is secured the upper or fixed platen 4 of the press.

The lower or movable platen 5, which is guided in its travel by means of the strain rods 3, is carried on the piston 6 of a hydraulic ram which is employed for the purpose of moving the lower platen 5 toward and away from the fixed platen 4. The platens 4 and 5 carry auxiliary platens 7 and 8 respectively, said auxiliary platens being cored or otherwise provided for the circulation of a heating medium such as steam therethrough.

For convenience in the ensuing description and in the claims, the opposed faces of the auxiliary platens 7 and 8 will be referred to as the faces of the platens 4 and 5 respectively.

The upper platen 4, including the auxiliary platen 7, is provided with a cylindrical transfer molding cavity 9 extending therethrough.

Arranged between the upper and lower platens is a mold generally indicated at 10 and which comprises mating sections 11 and 12 having juxtaposed matrix faces. The mold 10 is provided with an injection opening 13 in register with the transfer molding cavity 9.

Extending upwardly from the fixed platen 4 is a yoke generally indicated at 14, on the upper end of which is mounted a fluid pressure cylinder 15 in which there is reciprocably mounted a piston 16, the lower end 17 of which is in axial alignment with the transfer molding cavity 9. The outside diameter of the piston 17 is such as to have close fitting telescopic engagement with the walls of the transfer molding cavity 9.

The hydraulic ram 6 and the cylinder 15 will be provided with sutiable fluid connections whereby they may be operated in opposite directions. However, since such projection is customary in the art, it is believed unnecessary to illustrate or describe the same herein.

The operation of the press illustrated in Figs. 1 and 2 may be described briefly as follows:

At the beginning of a molding cycle, the movable platen 5 will, of course, be in a position lower than that illustrated in Fig. 1, i. e. separated from the fixed platen 4 for a distance sufficient to permit the insertion therebetween of the mold 10. After the empty mold is placed on the movable platen 5, the ram 6 is energized forcing the lower platen, and the mold 10 carried thereby, into engagement with the upper platen 4, with the transfer opening 13 in register with the transfer cavity 9. A suitable quantity of moldable material such as rubber is then placed in the transfer cavity 9, after which the piston 17 will be brought down to the position illustrated in Fig. 2 by means of the jack 15. It will be observed that the length of the piston 17 is such that when the head thereon in the jack 15 reaches the lower limit of its travel in the jack, the forward end of the piston 17 will be flush with the lower face of the fixed platen 4.

After the mold 10 has been filled, the mold will be held closed between the heated platens for a length of time sufficient to thermally set or vulcanize the contents of the mold after which the ram 6 will be lowered making it possible to remove the mold from the press after which the mold will be emptied and reinserted in the press or a new mold inserted in the press.

The press illustrated in Fig. 3 is generally similar in principle to the press illustrated in Figs.

1 and 2 except that it is capable of accommodating two molds.

The press illustrated in Fig. 3 comprises a base generally indicated at 18 from which project lugs 19 which carry strain rods 20, to the upper end of which is secured the fixed platen 21. The base 18 carries two rams 22 and 23 and on such rams is mounted a lower platen 24 and intermediately of the platens 21 and 24 is another platen 25. For convenience in identification throughout the following description and in the claims, the platen 21 is referred to as the first platen, the platen 25 is referred to as the second platen, and the platen 24 is referred to as the third platen.

The lower platen 24 carries an auxiliary heating platen 26 and the upper fixed platen 21 carries an auxiliary heating platen 27. The intermediate or second platen 25 is cored out to provide for the circulation of a heating fluid such as steam therethrough so that it need not have associated therewith a heating platen such as Nos. 26 and 27. Any suitable means such as stops 28, carried by the base 8 and projecting through openings provided therefor in the lower platen 24, may be employed for the purpose of limiting the extent to which the platen 25 may descend as the rams 22 and 23 are caused to move downwardly, carrying the platen 24 therewith.

Mounted on the head of the press or the fixed platen 21 are yokes 29 and 30 which respectively support jacks 31 and 32 from which transfer molding pistons 33 and 34 respectively project. The platens 21 and 25 are respectively provided with transfer molding cavities 35 and 36 which are in axial alignment with the pistons 33 and 34. The molds such as 37 and 38 employed with a press of this character will be generally similar to the molds used with the press illustrated in Figs. 1 and 2, with the exception that the injection openings such as 39 and 40 therein are arranged at one side of the center so as to register with the transfer cavities 35 and 36 respectively.

The operation of the press illustrated in Fig. 3 will be self-evident from the description of the operation of the press illustrated in Figs. 1 and 2. It will be observed that in the construction illustrated in Fig. 3, the length of the piston rods 33 and 34 is such that when the pistons associated therewith reach the limit of their downward travel, the lower ends of the piston rods will be flush with the lower faces of the platens with which such pistons are associated.

It is an important feature of this invention that the transfer molding pistons such as 17, 33 and 34 are each arranged with their axes parallel to the main ram of the press such as 6, 22, and 23 and also so arranged that an extension of the axes of the transfer pistons lies within the circumference of the main jacks on the press. In this way, the deflection of the press parts during the transfer molding operation is reduced to a minimum.

Having the transfer pistons move downwardly during the molding operation until their lower ends are flush with the mold engaging face of the platens has numerous advantages. In the first place, this arrangement makes it impossible for the molds to be damaged during the closing or opening of the press. A second and equally important advantage of this arrangement is that at the conclusion of each molding operation any residue of the moldable material which may be left in the transfer cavity may be readily removed therefrom and the transfer cavity thoroughly cleaned before a new charge is introduced thereto.

Other modes of applying the principle of the invention may be employed, change being made as regards the details described, provided the features stated in any of the following claims or the equivalent of such be employed.

I, therefore, particularly point out and distinctly claim as my invention:

1. In a transfer molding press, the combination of a fixed platen, a plurality of superimposed movable platens, a plurality of laterally contiguous closure rams for moving said platens toward and away from each other, molds clamped in the spaces between said platens under the influence of said closure rams, each of said molds provided with an injection opening in one of its platen engaging faces, an injection cavity extending through each of said platens excepting the lowermost and in register with the injection opening of the mold with which the lower face of the platen is in engagement, a plurality of injection rams respectively arranged in alignment with said injection cavities, said rams each including a piston movable into the associated injection cavity, the axes of said injection cavities being respectively substantially parallel to the axes of said closure rams and when extended lie within the circumference thereof.

2. In a transfer molding press, the combination of a fixed platen, a plurality of superimposed movable platens, a plurality of laterally contiguous closure rams for moving said platens toward and away from each other, molds clamped in the spaces between said platens under the influence of said closure rams, each of said molds provided with an injection opening in one of its platen engaging faces, an injection cavity extending through each of said platens excepting the lowermost and in register with the injection opening of the mold with which the lower face of the platen is in engagement, a plurality of injection rams respectively arranged in alignment with said injection cavities, said rams each including a piston movable into the associated injection cavity, and means for actuating each of said pistons within such limits that its forward end is substantially flush with the mold engaging face of its associated platen or retracted from the injection cavity contained therein, the axes of said injection cavities being respectively substantially parallel to the axes of said closure rams and when extended lie within the circumference thereof.

3. In a transfer molding press, the combination of a fixed platen, a plurality of superimposed movable platens, a plurality of laterally contiguous closure rams for moving said platens toward and away from each other, each of said platens provided with means for heating the same, molds clamped in the spaces between said platens under the influence of said closure rams, each of said molds provided with an injection opening in one of its platen engaging faces, an injection cavity extending through each of said platens excepting the lowermost and in register with the injection opening of the mold with which the lower face of the platen is in engagement, a plurality of injection rams respectively arranged in alignment with said injection cavities, said rams each including a piston movable into the associated injection cavity, and means for actuating each of said pistons within such limits that its forward end is substantially flush with the mold engaging face of its associated platen or retracted from the injection cavity contained therein, the axes of said injection cavities being respectively substantially parallel to the axes of said closure rams and when extended lie within the circumference thereof.

4. In a transfer molding press, the combination of a first fixed platen, second and third movable platens, first and second molds respectively positioned between said first and second and said second and third platens, each of said molds provided with an injection opening facing toward said first platen, an injection cavity extending through each of said first and second platens, and an injection ram associated with each of said injection cavities, each such injection ram including a piston movable into the associated injection cavity.

5. In a transfer molding press, the combination of a first fixed platen, second and third movable platens, means for relatively moving said platens toward and away from each other, first and second molds respectively positioned between said first and second and said second and third platens, each of said molds provided with an injection opening facing toward said first platen, an injection cavity extending through each of said first and second platens, an injection ram associated with each of said injection cavities, each such injection ram including a piston movable into the associated injection cavity, and means for actuating said pistons within such limits that its forward end is substantially flush with the mold engaging face of the platen containing the associated injection cavity or retracted from such cavity at the opposite side of such platen.

6. In a transfer molding press, the combination of a first fixed platen, second and third movable platens, a plurality of laterally contiguous closure rams for relatively moving said platens toward and away from each other, first and second molds respectively positioned between said first and second and said second and third platens, each of said molds provided with an injection opening facing toward said first platen, an injection cavity extending through each of said first and second platens, the axes of said cavities being respectively arranged to lie within the circumference of said closure rams, an injection ram associated with each of said injection cavities, each such injection ram including a piston movable into the associated injection cavity, and means for moving said pistons.

7. In a transfer molding press, the combination of a first fixed platen, second and third movable platens, a plurality of laterally contiguous closure rams for relatively moving said platens toward and away from each other, first and second molds respectively positioned between said first and second and said second and third platens, each of said molds provided with an injection opening facing toward said first platen, an injection cavity extending through each of said first and second platens, the axes of said cavities being respectively arranged to lie within the circumference of said closure rams, an injection ram associated with each of said injection cavities, each such injection ram including a piston movable into the associated injection cavity, and means for actuating said pistons within such limits that its forward end is substantially flush with the mold engaging face of the platen containing the associated injection cavity or retracted from such cavity at the opposite side of such platen.

8. In a transfer molding press, the combination of first, second, and third relatively movable superimposed platens, first and second molds positioned respectively between said first and second and said second and third platens, means operative to relatively move all of said platens toward one another to thus clamp both of said molds therebetween, each of said molds being formed with an injection opening, each of two of said platens being formed with an injection cavity, the cavities in said two platens respectively registering with the injection openings in said molds, and a piston associated with each of such injection cavities and movable therein to force molding material from such cavities into said molds through such injection openings.

9. In a transfer molding press, the combination of first, second, and third relatively movable superimposed platens, first and second molds positioned respectively between said first and second and said second and third platens, means operative to relatively move all of said platens toward one another to thus clamp both of said molds therebetween, each of said molds being formed with an injection opening, said first and second platens each being formed with an injection cavity, the cavity in said first platen being in register with the opening in said first mold and the cavity in said second platen being in register with the opening in said second mold, and a piston associated with each of such injection cavities and movable therein to force molding material from such cavities into said molds through such injection openings.

10. In a transfer molding press, the combination of first, second, and third relatively movable superimposed platens, first and second molds positioned respectively between said first and second and said second and third platens, means operative to relatively move all of said platens toward one another to thus clamp both of said molds therebetween, each of said molds being formed with an injection opening, said second platen and one of said first and third platens each being formed with an injection cavity, such cavities being respectively in register with such injection openings in said molds, and a piston associated with each of such injection cavities and movable therein to force molding material from such cavities into said molds through such injection openings.

ANSELM DE GHETTO.

REFERENCES CITED

The following references are of record in the file of this patent:

UNITED STATES PATENTS

| Number | Name | Date |
|---|---|---|
| Re. 18,202 | Polak | Sept. 22, 1931 |
| 1,800,849 | Stacy | Apr. 14, 1931 |
| 1,919,534 | Shaw | July 25, 1933 |
| 1,978,985 | Cobb | Oct. 30, 1934 |
| 2,017,216 | Marcus | Oct. 15, 1935 |

FOREIGN PATENTS

| Number | Country | Date |
|---|---|---|
| 634,564 | Germany | Aug. 29, 1936 |

OTHER REFERENCES

Injection Molding of Thermosetting Plastics, part II, British Plastics, April 1939, pages 628 to 634 (page 631, only, is relied upon). Copy in Div. 15.